Aug. 13, 1935.  R. P. CROTHERS  2,011,039
PROCESS OF TREATING SULPHUR BEARING ORE
Filed July 15, 1933
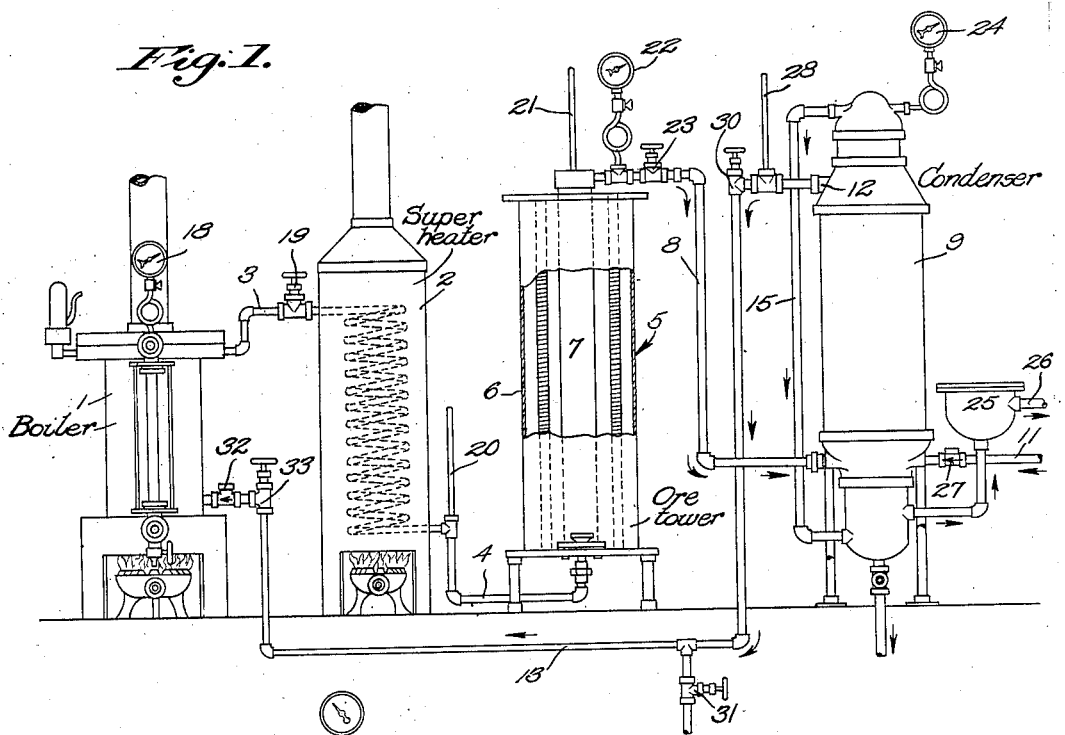
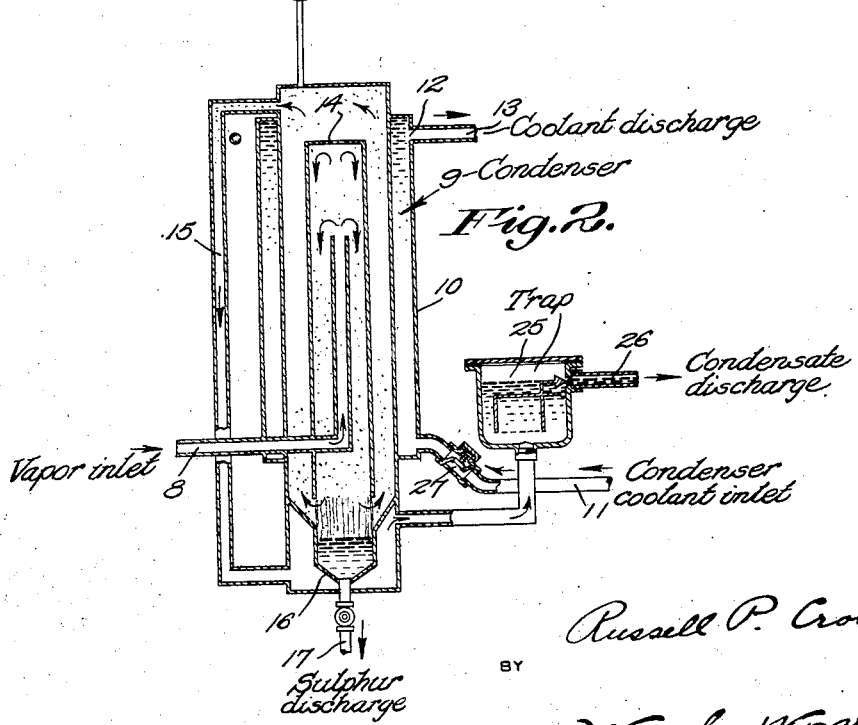
INVENTOR
Russell P. Crothers
BY
Woods Wood
ATTORNEYS Patented Aug. 13, 1935

2,011,039

UNITED STATES PATENT OFFICE 2,011,039

PROCESS OF TREATING SULPHUR BEARING ORE

Russell P. Crothers, Cincinnati, Ohio

Application July 15, 1933, Serial No. 680,647

15 Claims. (Cl. 23—227)

This invention relates to a process of refining sulphur ore in which the sulphur is in finely dispersed condition. One ore of this type comprises sulphur, calcium sulphate, moisture and usually a minor percentage of calcium carbonate, dirt and other impurities. Ores of this general type will be used as a basis of disclosure since they are found in large quantities in parts of Texas. The ore, of course, varies over an appreciable range in regard to sulphur content and moisture content, but the ores of this type generally contain two well known and useful commercial products, sulphur and plaster of Paris or gypsum.

The calcium sulphate deposit is in hydrated condition so that from the point of view of obtaining a useful plaster, it is necessary to both remove the sulphur from the calcium sulphate and partially dehydrate it to the condition of a hemi-hydrate.

The invention is, therefore, susceptible to being regarded from three different points of view:

1. Sulphur may be regarded as the primary product to be obtained by the process and all conditions of the process coordinated and controlled to provide the most economical production of sulphur;

2. Plaster may be considered the primary product to be obtained by the process and all conditions coordinated and controlled to provide the best yield of usable plaster most economically;

3. The conditions of the process may be coordinated and controlled to provide yields of both sulphur and plaster from most of the ore upon a satisfactory economic basis.

The expediency of practicing this process from the point of view of paragraphs 1, 2 or 3 necessarily depends upon the nature of the ore being treated and the nature of the available markets for the sulphur and plaster respectively.

In the ores in question, the sulphur and plaster are very finely subdivided and intermixed. The ores might be compared to a very fine emulsion in which the sulphur is comparable to a finely divided inner phase and the hydrated plaster to the outer phase. On this account, efforts to separate the plaster and sulphur by the usual melting processes, have proved unavailing. Even when the ore is heated to a temperature at which the sulphur is molten, the finely divided sulphur particles do not coalesce and separate from the mass to a useful extent, due probably to the surface tension of the particles of liquid sulphur and the surrounding phase of plaster.

This invention resides in a series of determinations, the first of which is that the fine division of sulphur provides a remarkably large surface of sulphur within the ore. Next, it has been determined that the vapor pressure of sulphur in its environment of hydrated plaster, is such at about the temperature of 250° C. and above, that the sulphur has a decided tendency to free itself from the plaster. The use of such a temperature is a reversal of the concepts pertinent to problems of separating sulphur from its environment by melting, since sulphur melts at 135° C., reaches a maximum fluidity at 160° C., and then becomes less fluid and ceases to flow at about 250° C. The temperature of 250° C. or above, is, therefore, such as to inhibit flow or coalescence, (a minor amount might take place at about 160° C.), thereby maintaining the large surface area of sulphur in the plaster and permitting the vapor pressure of the sulphur to be most advantageously exploited.

The physical separation of the sulphur from the ore is accomplished by means of a gas which is chemically inert in relation to the sulphur such as superheated steam. The sulphur is thus removed from the ore in the vapor phase.

This process is, therefore, made possible by the determination that while the ore in question is too dense to permit any useful degree of flow of molten sulphur, it is sufficiently porous to permit the escape of sulphur vapor in the presence of superheated steam.

In regard to the plaster it is well known that the hydrated calcium sulphate, $CaSO_4.2H_2O$, when heated above 107° C., gives off part of its water of crystallization, forming the hemi-hydrate $CaSO_4.1/2H_2O$. It is this hemi-hydrate which is desirable as an industrial plaster. If the heating is continued, the anhydrous plaster is formed between 160 and 210° C. This anhydrite has the power of absorbing water slowly to the condition of the hemi-hydrate. If the heating is continued further to a temperature above 210° C., the plaster completely loses its power to absorb moisture and is referred to as "dead-burned". Such plaster is valueless.

It will, therefore, be apparent that the temperature 250° C. which is suitable for removing the sulphur in vapor phase, is sufficiently high to "dead-burn" the calcium sulphate and render it useless and valueless. The degree of dehydration of the plaster, however, is a function of time as well as of temperature.

The time necessary to remove the sulphur depends not only upon the temperature (more or less than 250° C.), but also on the density of the mass of ore being treated and the exposure to the steam. If the mass is very dense, it will necessarily take the greater length of time for the superheated steam to penetrate and withdraw the sulphur, than if the mass is less dense.

Therefore, another element of this invention is the determination that ores of the specified type when ground into particles approximating one-eighth to one-half inch in diameter, are susceptible to having the sulphur removed completely in vapor phase process at temperatures such as 250 to 300° C. before becoming "dead-burned", and before losing too much moisture content to render them unfit for use as industrial plasters.

It will be obvious to the skilled engineer that the coarseness or fineness to which the ore is ground must be related to the physical apparatus used in practicing the process, the amount of steam used and exposure provided, the thickness of the layer treated and the relative moisture and sulphur contents of the ore. As discussed above, the fineness of the grinding and the nature of the apparatus must also be considered in relation to whether the sulphur or the plaster is to be considered the primary product, or whether the process is to be conducted for providing commercial yields of both. If the apparatus employed for contacting the ore and the steam be highly efficient in this respect, the ore need not be ground so finely.

If the sulphur is the only desired product of the process, the temperature of the superheated steam may be elevated to a temperature which provides the greatest thermal efficiency for the particular apparatus employed. After the sulphur is removed from the ore by the superheated steam, the two are in an intimately mixed condition. The problem is to effect a separation of the sulphur and the steam.

All of the processes of the past for purifying sulphur by vaporization have been in the nature of subliming processes. The sulphur has been converted from a solid state to a gaseous state and then back again into a solid state by contact usually with the chilled walls of a subliming chamber. This subliming process is inherently a difficult process to carry out in large scale operations for the reason that the accumulation of the sulphur on the walls of the subliming chamber inhibits transfer of heat. Moreover, it is necessary to provide some means or mechanism for scraping the walls in order to recover the sulphur.

One of the features of the present invention is the method of separating the sulphur vapor from the superheated steam. The method herein employed comprises condensing the sulphur and the water vapor to liquid condition under such pressure that the condensed steam is above the melting point of the sulphur so that the sulphur remains in molten condition. The molten sulphur then separates by gravity from the condensed steam and may be drawn off from the condenser in molten or liquid condition and cast into appropriate forms.

Otherwise expressed, the superheated steam and vaporous sulphur are passed into a condenser, the mass temperature of which is above the melting point of the sulphur; the liquids are permitted to separate in the condenser and are separately removed from the condenser as liquids. By this system of condensing under pressure all of the steam and all of the sulphur vapor are condensed to a liquid condition; no sulphur is deposited upon the walls of the chamber and none escapes in vaporous condition. If the condensing did not take place under pressure either some of the sulphur would solidify in the condensing apparatus, or some of it would escape with uncondensed steam, due to the fact that the melting point of sulphur is higher than the boiling point of water. It is recommended that the condenser be made of aluminum since aluminum does not readily react either with the sulphur vapor or with the molten sulphur and because aluminum, having high thermoconductivity, permits very efficient transfer of heat.

In view of the fact that the latent heat of vaporization is taken out of the steam in the condenser system and that this quantity of heat is very appreciable, it is desirable not only to remove it from the condenser system, but to utilize it. This is accomplished by using the water which is to be converted into superheated steam for cooling the condenser system. By so doing the water is introduced into the boilers preheated to substantially the boiling point or above the boiling point. This arrangement reduces the cost of operating the plant very materially.

It is also to be observed that this efficiency of plant operation is interlinked with and dependent upon the use of a metal condenser system operated under a pressure sufficiently high to condense the steam above the melting point of sulphur. This not only facilitates the withdrawal of the sulphur from the condenser, but prevents solidification of sulphur on the condenser walls which would of course, seriously interfere with the efficiency of the heat transfer.

For the purpose of assisting the skilled in the art in understanding this invention and process, one form of apparatus is herein disclosed suitable for carrying out this invention, and one specific example of the treatment of a specific ore is provided, the example chosen being one wherein the ore is treated to provide satisfactory yields of both sulphur and plaster.

In the attached drawing, Figure 1 is a diagrammatic view of one form of apparatus adapted for the practice of this process; and Figure 2 is a detailed diagrammatic sectional view of the condenser disclosed in Figure 1.

In this drawing the source of steam is disclosed as a boiler 1. This boiler is connected to a superheater 2 by means of a pipe 3. A pipe 4 connects the superheater to a tower 5. The tower comprises an outer insulating jacket 6 and an aluminum column 7 within it.

The ore is placed in the aluminum column 7. Materials other than aluminum may be used, provided they have the requisite resistance to the corrosive action of sulphur vapor. A pipe 8 connects the top of the tower column with the bottom of the condenser 9. The condenser comprises a water jacket 10 having an inlet 11 and an outlet 12. As disclosed, the outlet 12 is connected by a pipe 13 to the original boiler producing the steam so that the water introduced into the boiler for producing steam is preheated by the condenser.

Within the water jacketed portion of the condenser is an inverted cup-shaped member 14 which constitutes an inner chamber. The pipe 8 connected to the tower column extends upwardly into this inverted cup-shaped member (a little bit more than half way is disclosed). Immediately under the inverted cup-shaped member is a well 16 in which molten sulphur is adapted to collect. The pipe 17 leading from this well is provided to draw off the molten sulphur. As disclosed the well is heated by the water from the upper part of the condenser through pipe 15.

The general operation of the device is that the steam generated by the boiler is heated to a temperature above 250° C. by the superheater and then introduced in the base of the column containing the ore. Additional heating elements may be used if and as desired in the tower structure.

The superheated steam takes up the sulphur from the ore in the tower and then is transferred over to the condenser. The pressures and temperatures of the condenser are so maintained that the sulphur condenses to a liquid state in the inverted cup-shaped member and accumulates in a liquid state in the well below the cup-shaped member from which it is drawn off through the outlet pipe. The temperatures and pressures are, therefore, so controlled that the sulphur will condense before it leaves the inner chamber but it will still be at a sufficiently elevated temperature to flow in order that the walls of the inner chamber do not become coated with solid sulphur. The molten sulphur thus separates from the condensed steam by gravity flow.

In order to effect these appropriate conditions of temperature and pressure, the following primary controls are provided. The boiler is provided with a pressure gauge 18. The pipe between the boiler and superheater is provided with a control valve 19. The pipe between the superheater and the tower is provided with a temperature indicating instrument 20. The tower is provided with a temperature indicating instrument 21 at the top of the aluminum column. The pipe line between the top of the column and bottom of the condenser is provided with a pressure indicating instrument 22 and control valve 23. The top of the condenser is provided with a pressure indicating instrument 24.

The condensed steam in the form of water leaving the condenser passes through steam trap 25 and out through an exhaust pipe 26. The intake 11 for the condenser water jacket is provided with a check valve 27. The outlet 12 of the water jacket for the condenser is provided with a temperature indicator 28, and control valve 30. In the line between the water jacket and the boiler, an exhaust valve 31 is provided which may regulate the amount of water introduced into the boiler, the remainder escaping through the exhaust valve. This line between the water jacket of the condenser and the boiler is also provided with a check valve 32 and a control valve 33 adjacent to the boiler.

By means of these valves, check valves, temperature regulating instruments, pressure regulating instruments, and by means of the regulation of the various heating elements which may be used for the boiler, the superheater and if desirable for the tower, the appropriate temperatures and pressures are provided for practicing the process with whatever deviations and variations may be desirable to effect the primary recovery of either the sulphur or the plaster.

For the purpose of assisting the skilled in the art, specific examples of the treatment of batches of ore are here provided:

|  | To produce sulphur and gypsum | To make high-grade gypsum sulphur negligible |
|---|---|---|
| Quantity of ore | 1 lb. | 1 lb. |
| Sulphur | 29.60% | 5.40% |
| Water | 7.60% | 21.00% |
| Dirt | 6.03% | 1.65% |
| CaCO$_3$ | 4.30% | 2.92% |
| CaSO$_4$ | 52.47% | 69.30% |
|  | 100% | 100% |
| Time | 1 hr.—41 min. | 49 min. |
| Boiler pressure—average gauge | 45.7 lbs. | 97.0 lbs. |
| Pressure entering tower—av. ga. | 45.7 lbs. | 96.5 lbs. |
| Temperature in tower | 231.0° C. | 274.7° C. |
| Pressure leaving tower | 42.9 lbs. | 95.8 lbs. |
| Temperature leaving tower | 201.3° C. | 247.5° C. |
| Pressure in condenser | 41.5 lbs. | 77.8 lbs. |
| Temperature cooling water leaving condenser and entering boiler. | 117.2° C. | 138.3° C. |
| Weight of steam passed through ore | 11.78 lbs. | 3.30 lbs. |

Having described my invention, I desire to be limited only by the following claims:

1. The process of recovering finely divided sulphur from a mineral environment, said process comprising heating said material containing the sulphur to a temperature at which the sulphur tends to vaporize, removing said sulphur in vapor phase by means of a gas chemically inert in relation to the sulphur and condensible at a temperature above the melting point of sulphur, liquefying all of said vapor and said gas under pressure, and separating said liquids.

2. The process of manufacturing plaster from hydrated calcium sulphate containing finely divided and dispersed sulphur, said process comprising treating said ore with superheated steam at a temperature approximating 250° C. for a period of time sufficient to remove the sulphur but not sufficient to completely dehydrate the calcium sulphate.

3. The process of manufacturing sulphur and plaster from an ore comprising hydrated calcium sulphate and finely divided and dispersed sulphur, said process comprising subdividing the ore and exposing it to the action of a quantity of superheated steam sufficient to remove the sulphur in vapor phase before the complete dehydration of the calcium sulphate has taken place.

4. The process of obtaining hemi-hydrated calcium sulphate and sulphur from an ore comprising hydrated calcium sulphate and finely dispersed sulphur, said process comprising removing said finely dispersed sulphur from the ore in vapor phase by means of a hot gas chemically inert in relation to the sulphur, the temperature of which is sufficient to vaporize said sulphur, said gas introduced in quantity sufficient in relation to the exposure provided by the state of subdivision of the ore to remove said sulphur and reduce the hydrated calcium sulphate to a hemi-hydrate without dead burning said calcium sulphate.

5. The process of recovering sulphur from ore in which the sulphur exists in the ore in a finely divided state, said process comprising removing the sulphur from the ore in vapor phase by means of superheated steam, condensing said steam and said sulphur vapor at a temperature above the melting point of sulphur, and separating the molten sulphur from the condensed steam.

6. The process of recovering sulphur from ore in which the sulphur exists in the ore in a finely divided state, said process comprising removing the sulphur from the ore in vapor phase by means of superheated steam, condensing said steam and said sulphur vapor at a temperature above the melting point of sulphur, separating the molten sulphur from the condensed steam, and effecting the transfer of the latent heat of vaporization from the condensed steam to the water to be used for conversion into steam for removing the sulphur from the ore.

7. The process of extracting sulphur from an ore containing it in finely divided condition, said process comprising removing the sulphur from the ore in vapor phase by means of superheated steam, introducing said steam and vapor into a metal condensing system, maintaining a pressure and temperature in said condenser system adapted to liquefy the steam and the sulphur, separating the molten sulphur from the condensed steam in the condenser system, and transferring the heat resulting from the condensing of the steam to the water to be used for generating the superheated steam for extracting the sulphur from the ore.

8. The process of recovering sulphur from ore in which the sulphur exists in the ore in a finely divided state, said process comprising removing the sulphur from the ore in vapor phase by means of superheated steam, condensing said steam and said sulphur vapor under sufficient pressure to maintain the mass temperature of the condenser higher than the melting point of sulphur, and removing the molten sulphur and the condensed steam from the condenser separately.

9. The process of recovering sulphur from ore in which the sulphur exists in the ore in a finely divided state, said process comprising removing the sulphur from the ore in vapor phase by means of superheated steam at a temperature below the boiling point of sulphur, condensing said steam and said sulphur vapor under pressure at a temperature above the melting point of sulphur, and separating the molten sulphur from the condensed steam.

10. The process of extracting sulphur from an ore containing it in finely divided condition, said process comprising removing the sulphur from the ore in vapor phase by means of superheated steam, cooling the superheated steam and sulphur vapor under a pressure adapted to condense them to liquid condition at a temperature above the melting point of sulphur, and separating the molten sulphur from the condensed steam by gravity.

11. The process of manufacturing plaster from hydrated calcium sulphate ore containing finely divided and dispersed sulphur, said process comprising treating said ore with a gas chemically inert in relation to the sulphur at a temperature approximating 250° C. for a period of time sufficient to remove the sulphur but not sufficient to completely dehydrate the calcium sulphate.

12. The process of manufacturing sulphur and plaster from an ore comprising hydrated calcium sulphate and finely divided and dispersed sulphur, said process comprising subdividing the ore and exposing it to the action of a hot gas chemically inert in relation to the sulphur sufficient in quantity and temperature to remove the sulphur in vapor phase before the complete dehydration of the calcium sulphate has taken place.

13. The process of optionally recovering plaster or sulphur from an agglomerate containing hydrated calcium sulphate and finely divided and dispersed sulphur, comprising, comminuting said agglomerate, treating said agglomerate with a gas at a temperature above 250° C. which is chemically inert in relation to said sulphur and condensible above the melting point of said sulphur for a period of time dependent upon the end product desired, said period of time being insufficient to completely dehydrate the calcium sulphate if plaster is desired, said period of time being at least sufficient to remove said sulphur by vaporization of the sulphur particles, and after treating said agglomerate condensing said gas to a liquid at a temperature above the melting point of sulphur, whereby said liquid sulphur and said gas condensate separate while in liquid phase to allow the sulphur particles to coalesce into a liquid pool.

14. The process of separating the plaster and sulphur components of an agglomerate which contains hydrated calcium sulphate and finely divided sulphur, said process comprising treating said agglomerate by passing a hot gas therethrough at a temperature at least sufficient to vaporize the sulphur component and transport the same from the agglomerate, said gas being chemically inert in relation to sulphur and condensible at a temperature above the melting point of sulphur, directing said gas into a cooled atmosphere wherein condensation of the gas is controlled to occur at a temperature above the melting point of sulphur, subsequently recovering the sulphur by withdrawing the same from the liquid pool thus produced, and finally withdrawing the residue of the agglomerate comprising calcium sulphate from the heated gas atmosphere before complete dehydration of the hydrated calcium sulphate is allowed to occur.

15. The process of producing sulphur and plaster from a hydrated agglomerate containing calcium sulphate, throughout which sulphur is dispersed in finely divided condition, comprising, comminuting said agglomerate, separating the sulphur and plaster components thereof by passing a hot gas therethrough for a period of time sufficient to dehydrate the calcium sulphate to a hemi-hydrate, said treating gas being chemically inert in relation to sulphur, condensible at a temperature above the melting point of sulphur and at a treating temperature sufficient to at least vaporize the sulphur component and transport the same from the agglomerate and, after treating said agglomerate, condensing said gas to a liquid at a temperature above the melting point of sulphur, whereby liquid sulphur and said gas condensate separates while in liquid phase with the sulphur particles coalescing into a liquid pool.

RUSSELL P. CROTHERS.